United States Patent [19]

Gonzalez

[11] Patent Number: 5,159,777
[45] Date of Patent: Nov. 3, 1992

[54] FISHING CART APPARATUS

[76] Inventor: Oziel Gonzalez, 369 S. Dick Dowling, San Benito, Tex. 78586

[21] Appl. No.: 800,989

[22] Filed: Dec. 2, 1991

[51] Int. Cl.⁵ .................. B62B 1/00; A01K 97/00
[52] U.S. Cl. .................. 43/54.1; 280/47.19; 280/47.26; 280/47.29
[58] Field of Search ............ 43/54.1, 55; 280/47.18, 280/49.19, 47.26, 47.29

[56] References Cited

U.S. PATENT DOCUMENTS

| | | | |
|---|---|---|---|
| 2,433,886 | 6/1948 | Bremer | 280/47.19 |
| 2,964,328 | 12/1960 | Muir | 280/47.29 |
| 3,052,484 | 9/1962 | Huffman et al. | 280/47.19 |
| 3,494,631 | 2/1970 | Kreider | 280/47.19 |
| 3,804,432 | 4/1974 | Lehrman | 280/47.19 |
| 3,997,181 | 12/1976 | Jaco et al. | 280/47.19 |
| 4,355,818 | 10/1982 | Watts | 280/47.19 |
| 4,984,704 | 1/1991 | O'Malley | 280/47.19 |
| 5,024,458 | 6/1991 | Kazmark et al. | 280/47.18 |

Primary Examiner—Richard K. Seidel
Assistant Examiner—Chuck Y. Mah
Attorney, Agent, or Firm—Leon Gilden

[57] ABSTRACT

A fishing cart is arranged to include spaced parallel supporting posts mounting a wheel at each lower distal end of each post, and a rearwardly extending handle relative to an upper distal end of each post for ease of transport and positioning of the cart. The cart structure includes a lower work table pivotally mounted from a first position orthogonally oriented relative to the support post to a second position in parallel relationship relative to the supporting post. A tool box tray is pivotally mounted in association with the tool box secured to the tray at upper ends of the post adjacent the handles, with an underlying pivotally mounted mesh basket. A cooler structure is mounted to a cooler tray that is also pivotally mounted to the post for use of the tool box, basket, and cooler in a vertical transport position and in a horizontal operative position of the organization. Further, a bait arrangement is provided including refrigerant and access to the bait for use in a fishing procedure.

7 Claims, 4 Drawing Sheets

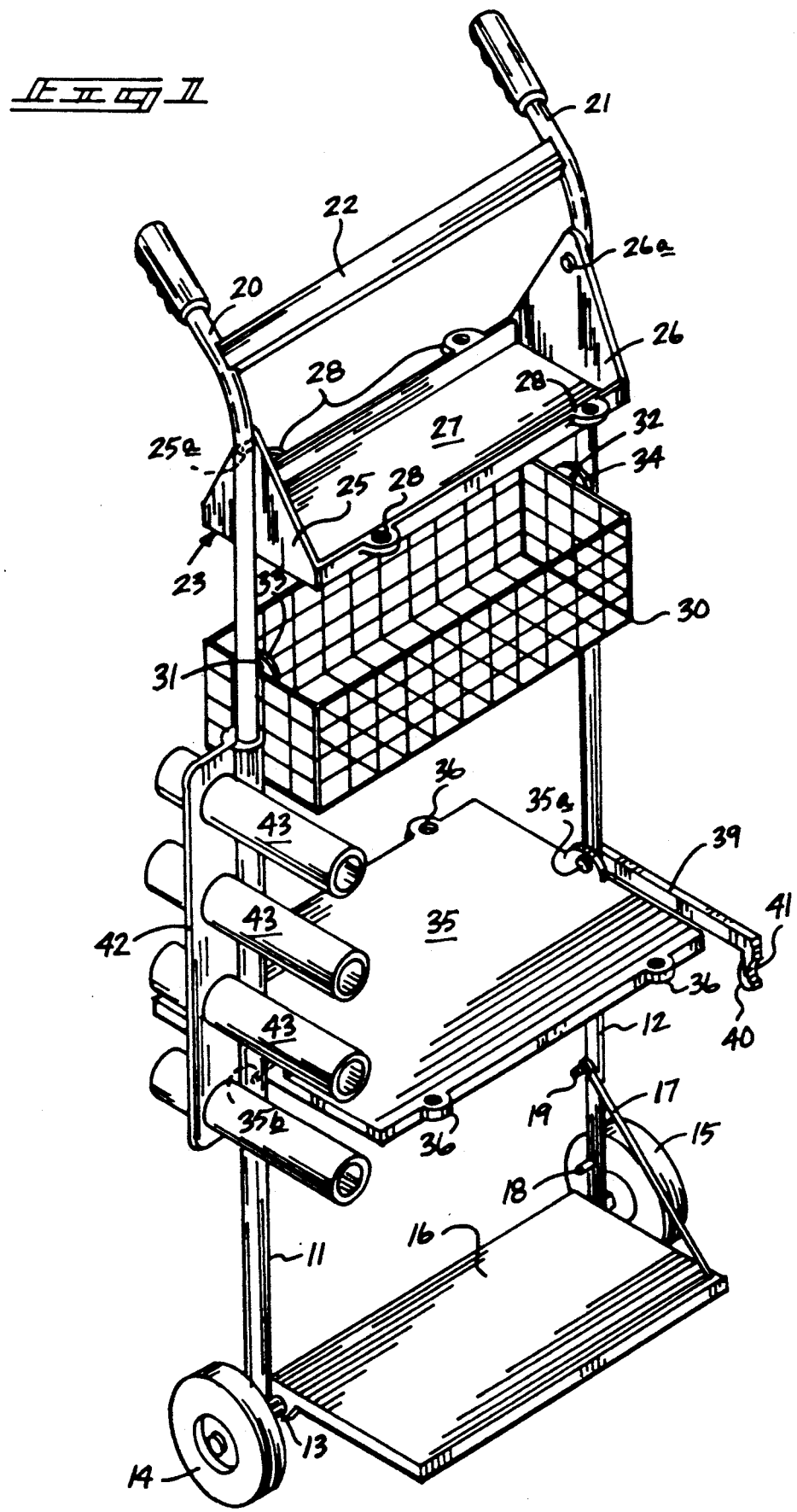

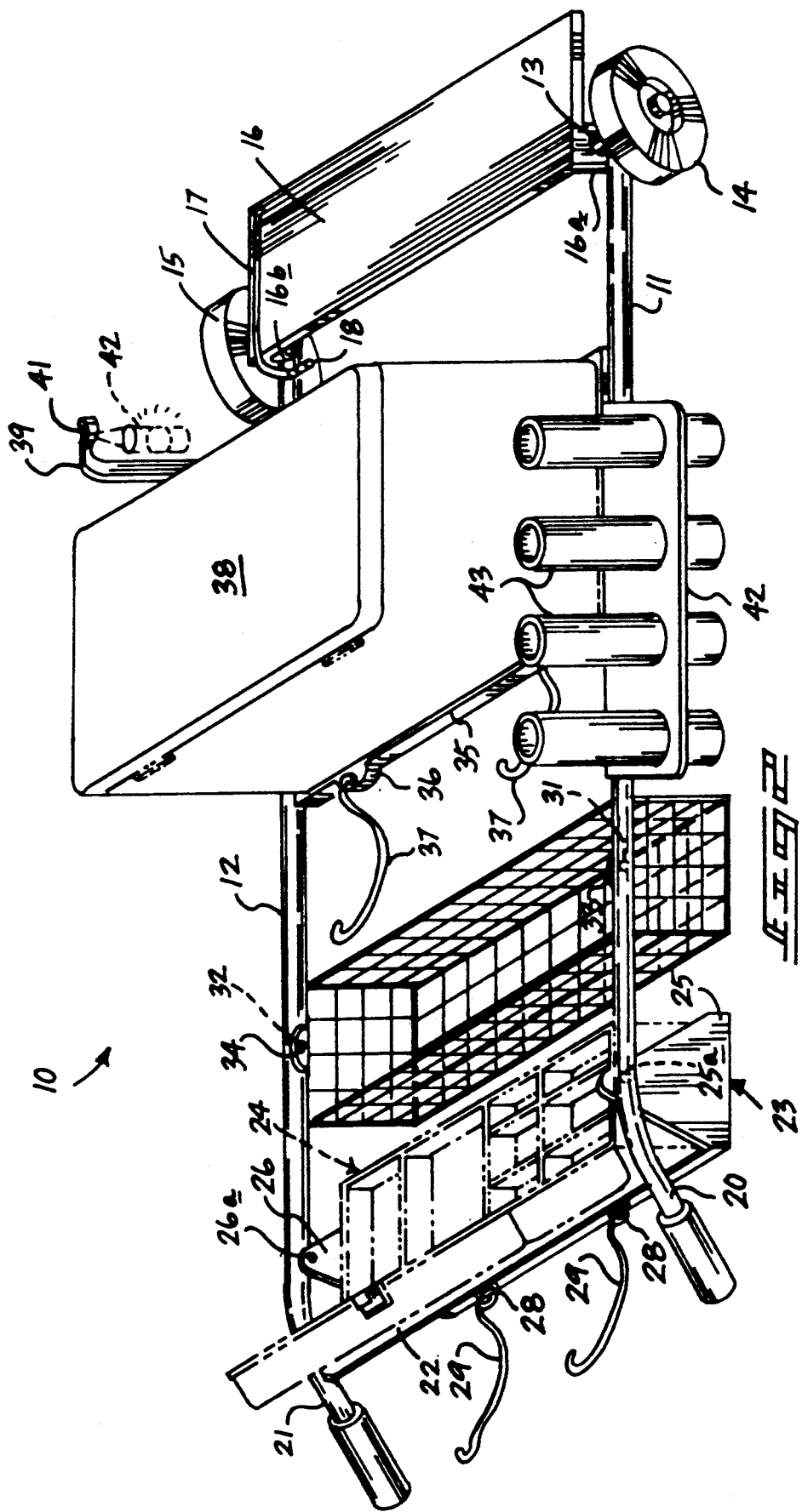

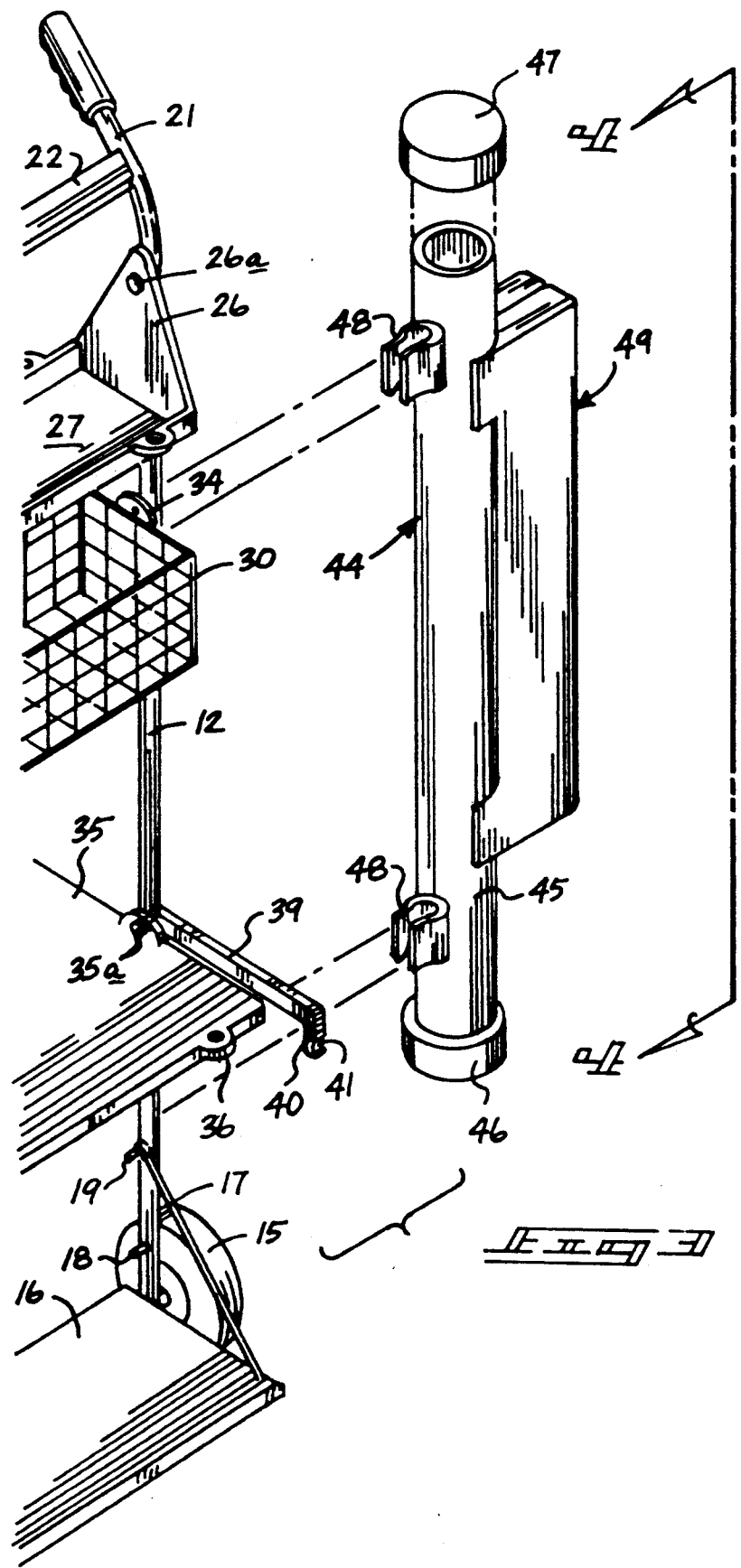

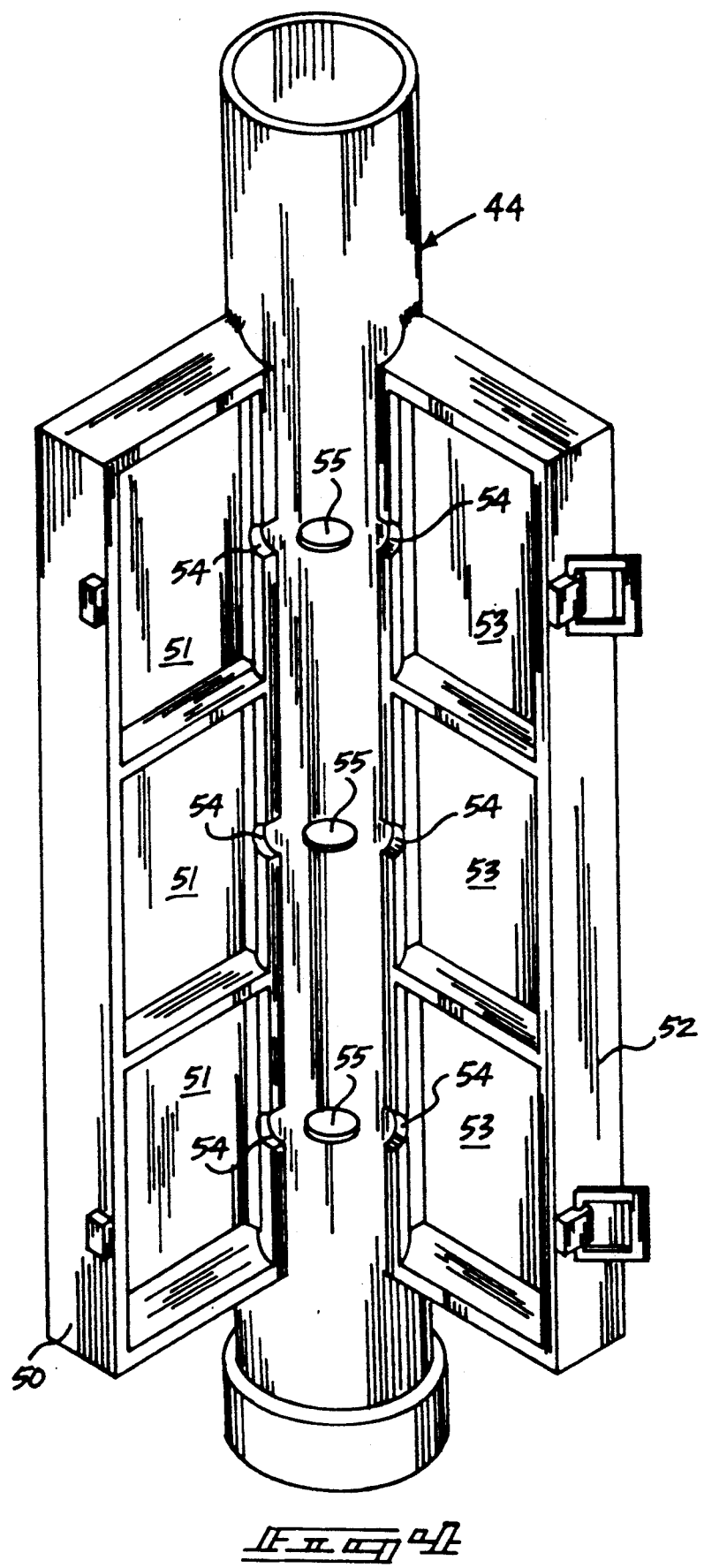

FISHING CART APPARATUS

BACKGROUND OF THE INVENTION

1. Field of the Invention

The field of invention relates to fishing apparatus, and more particularly pertains to a new and improved fishing cart apparatus wherein the same is arranged for the transport and orientation of various components utilized in a fishing procedure.

2. Description of the Prior Art

Fishing support structure of various types are utilized throughout the prior art, wherein a prior art carrier structure for rods and reels is exemplified in U.S. Pat. No. 3,674,190 to Wright providing a housing mounting the rod and reel structure, with the rod portions extending through an elongate member of the organization.

U.S. Pat. No. 4,073,085 to Stremeckus sets forth a fishing lure box arranged for the securement of various fishing hooks and the like therewithin.

U.S. Pat. No. 4,696,122 to Van Der Zyle sets forth a further example of a fishing rod carrier structure providing various support legs and a transport handle for the transport of the organization.

As such, it may be appreciated that there continues to be a need for a new and improved fishing cart apparatus as set forth by the instant invention which addresses both the problems of ease of use as well as effectiveness in construction in providing the mobile transport of various fishing components for use in a fishing procedure and in this respect, the present invention substantially fulfills this need.

SUMMARY OF THE INVENTION

In view of the foregoing disadvantages inherent in the known types of fishing apparatus now present in the prior art, the present invention provides a fishing cart apparatus wherein the same provides for a mobile organization to transport and use on site of various components employed in a fishing procedure. As such, the general purpose of the present invention, which will be described subsequently in greater detail, is to provide a new and improved fishing cart apparatus which has all the advantages of the prior art fishing apparatus and none of the disadvantages.

To attain this, the present invention provides a fishing cart arranged to include spaced parallel supporting posts mounting a wheel at each lower distal end of each post, and a rearwardly extending handle relative to an upper distal end of each post for ease of transport and positioning of the cart. The cart structure includes a lower work table pivotally mounted from a first position orthogonally oriented relative to the support post to a second position in parallel relationship relative to the support post. A tool box tray is pivotally mounted in association with the tool box secured to the tray at upper ends of the post adjacent the handles, with an underlying pivotally mounted mesh basket. A cooler structure is mounted to a cooler tray that is also pivotally mounted to the post for use of the tool box, basket, and cooler in a vertical transport position and in a horizontal operative position of the organization. Further, a bait arrangement is provided including refrigerant and access to the bait for use in a fishing procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing cart apparatus which has all the advantages of the prior art fishing apparatus and none of the disadvantages.

It is another object of the present invention to provide a new and improved fishing cart apparatus which may be easily and efficiently manufactured and marketed.

It is a further object of the present invention to provide a new and improved fishing cart apparatus which is of a durable and reliable construction.

An even further object of the present invention is to provide a new and improved fishing cart apparatus which is susceptible of a low cost of manufacture with regard to both materials and labor, and which accordingly is then susceptible of low prices of sale to the consuming public, thereby making such fishing cart apparatus economically available to the buying public.

Still yet another object of the present invention is to provide a new and improved fishing cart apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in a first transport configuration.

FIG. 2 is an isometric illustration of the invention in a second position for use on site in a fishing procedure.

FIG. 3 is an isometric illustration of the invention utilizing an associated bait canister organization.

FIG. 4 is an isometric illustration illustrating the bait canister organization in an opened configuration.

DESCRIPTION OF THE PREFERRED EMBODIMENT

With reference now to the drawings, and in particular to FIGS. 1 to 4 thereof, a new and improved fishing cart apparatus embodying the principles and concepts of the present invention and generally designated by the reference numeral 10 will be described.

More specifically, the fishing cart apparatus 10 of the instant invention essentially comprises a right support post 11 spaced from, parallel to, and coextensive with a left support post 12. An axle 13 is orthogonally directed adjacent a lower distal end of the right and left support posts 11 and 12 mounting respective right and left wheels 14 and 15 rotatably to the axle 13 exteriorly of the respective right and left support posts 11 and 12.

A work table 16 including a respective right and left axle flange 16a and 16b that are mounted orthogonally and downwardly relative to a bottom surface of the work table 16 receive the axle 13 therethrough. A support cable 17 is selectively mounted relative to an upper and lower cable mounting rod 19 and 18 fixedly mounted to the right support post 12, as illustrated, with a lower distal end of the support table 17 mounted to the table 16. The positioning of the table in an orthogonal first position, as illustrated in FIG. 1, the cable 17 is mounted to the upper cable mounting rod 19, whereupon positioning of the table in a parallel relationship relative to the right and left support posts 11 and 12 in the second position, as illustrated in FIG. 2, requires the mounting of the upper distal end of the cable to the lower cable mounting rod 18. In this manner, the table 16 is operative as a work table for the cleaning of fish and the like.

A right post arcuate leg 20 and a left post arcuate leg 21 define respective right and left upper portions of the right and left support posts 11 and 12 and extend rearwardly of the posts in a parallel relationship and extend rearwardly a predetermined distance substantially equal to a predetermined radius defined by the wheels 14 and 15. In this manner, the apparatus when in the second position, as illustrated in FIG. 2, orients the posts in a parallel relationship relative to an underlying support surface. A top cross brace 22 orthogonally and integrally mounted extending between the right and left arcuate legs 20 and 21 provides geometric integrity to the organization in cooperation with the axle 13 to define the rectilinear framework of the cart apparatus.

A tool box tray 23 is pivotally and orthogonally mounted between the right and left support posts below and in a parallel relationship relative to the cross brace 22. The tool box tray 23 includes a tool box 24 mounted in a selective manner thereto (see FIG. 2), wherein the tool box tray right and left end walls 25 and 26 respectively include respective right and left end wall axles 25a and 26a respectively that are coaxially aligned relative to one another orthogonally directed through the respective right and left end walls to effect pivotal mounting of the tool box tray 23 relative to the cart structure. The tray support floor 27 includes opposed sides that in turn includes plural pairs of spaced loops 28. Elastomeric tool box straps 29 extend over the tool box 24 between opposed side wall loops to engage and secure the tool box in a secure relationship relative to the tool box tray support floor 27.

A mesh basket 30 is mounted adjacent to and in a spaced relationship relative to the tool box tray 23, wherein the mesh basket 30 also extends in a parallel relationship relative to the tool box tray 23 orthogonally between the right and left support posts 11 and 12 to include respective mesh basket right and left support axles 31 and 32 respectively that are in turn coaxially aligned relative to one another and received through respective right and left support flanges 33 and 34 that are in a parallel relationship relative to one another and in adjacency relative to the right and left support posts.

Spaced from the mesh basket 30 that in turn is arranged to receive various components for drainage such as fish to be cleaned and the like, a cooler tray plate 35 is pivotally mounted between the right and left support posts utilizing respective cooler tray left and right axles 35a and 35b that are coaxially aligned relative to one another, with the cooler tray plate 35 including tray plate opposed loops 36 that are utilized with cooler housing elastomeric bands 37 to effect selective mounting of a refrigerant cooler housing lid 38 to the cooler tray plate 35.

A lantern support leg structure utilizes a first leg 39 orthogonally mounted extending forwardly of the left support posts, with a lantern support second leg 40 orthogonally mounted to a forward distal end of the first leg 39 that includes a second leg groove 41 to receive a lantern therewithin for providing illumination during periods of limited available light, such as in evening fishing.

A support flange 42 is mounted in a parallel integral relationship relative to the right support leg, that in turn includes a plurality of fishing rod support tubes 43 orthogonally directed through the flange 42 to receive fishing rods therethrough for their securement and transport.

The FIGS. 3 and 4 illustrate the use of a bait canister 44 that includes a bait canister support tube 45 formed with a tube lower cap 46 and a tube upper cap 47. The upper cap 47 is removably mounted, as well as the lower cap 46, in a manner as illustrated in the FIG. 3, to provide for the positioning and subsequent removal of bait for use in a fishing procedure. Spaced "U" shaped spring clips 48 mounted to the support tube 45 are in turn arranged to receive the left support tube 12 therewithin. A refrigerant case 49 is mounted to the support tube 45, wherein the refrigerant case 49 includes a case base member 50 pivotally mounting a refrigerant case lid 52 thereto utilizing fastener members to secure the base 50 relative to the lid 52. The base 50 includes a plurality of base compartments 51, wherein the lid includes lid compartments 53, each including cooperating base and lid compartment bores 54 that in turn are coaxially aligned with bait tube bores 55 to direct refrigerant such as dry ice and the like from the various base and lid compartments 51 and 53 through the base and lid compartment lid bores 54 into the support tube 45 through the bait tube bores 55. In this manner, the refrigerant is readily replenished without requiring manipulation of the bait within the bait support tube 45. Further, the bait support tube is readily removed from the cart structure for convenience when fishing without requiring repeated movement by an individual back to the cart structure.

As to the manner of usage and operation of the instant invention, the same shall be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing cart apparatus, comprising,
   a right support post in a spaced parallel coextensive relationship relative to a left support post, the right support post and left support post include a respective right post lower distal end and a left post lower distal end, with an axle integrally and orthogonally directed to the right support post and left support post adjacent the right post lower distal end and the left post lower distal end, and the axle rotatably mounting a right wheel and a left wheel mounted to respective right and left distal ends of the axle exteriorly of the right support post and left support post respectively, and
   a work table pivotally mounted to the axle, the work table including securement means to secure the work table in a first position orthogonally oriented relative to the right support post and left support post, with the work table pivotal to a second position arranged in a parallel relationship relative to the right support post and left support post, and
   the right wheel and the left wheel defined by a predetermined radius, and
   the right post including a right post arcuate leg extending rearwardly of the right post defining an upper portion of the right post, and
   a left post arcuate leg extending rearwardly of the left support post defining a left post upper end portion, the right post arcuate leg and left post arcuate leg arranged in a parallel coextensive relationship relative to one another extending rearwardly of the right post and the left post respectively, and
   the right post arcuate leg and the left post arcuate leg extend rearwardly of the respective right post and left post a predetermined distance, wherein the predetermined distance is substantially equal to the predetermined radius of the right wheel and the left wheel, and
   the securement means includes a lower cable mount rod fixedly mounted to the left support post adjacent the axle, and an upper cable mount rod spaced from the lower cable mount rod between the lower cable mount rod and the left post arcuate leg, and a support cable, the support cable fixedly mounted to the work table at a lower end of the support cable, and an upper end of the support cable selectively securable to the upper cable mount rod and the lower cable mount rod permitting displacement of the work table from the first position to the second position, and
   a top cross brace integrally and orthogonally extending between the right post arcuate leg and the left post arcuate leg defining a rectilinear configuration defined by the right support post, the left support post, the axle, and the top cross brace, and
   a tool box tray pivotally mounted between the right support post and the left support post adjacent the top cross brace, wherein the tool box tray includes a tool tray right end wall and a left end wall orthogonally oriented relative to the right support post and the left support post respectively, wherein the tool tray right end wall includes a right end wall axle orthogonally directed through the tool tray right end wall and wherein the right end wall axle is orthogonally mounted to the right support post, and the tool tray left end wall including a left end wall axle pivotally directed through the tool tray left end wall orthogonally mounted to the left support post, wherein the right end wall axle and the left end wall axle are coaxially aligned, and the tool tray including a tray right side edge and a left side edge, wherein the right side edge and left side edge include spaced pairs of loops, and the tool box tray including a tray support floor extending between the tool tray right end wall and the tool tray left end wall, and including a tool box mounted to the tray support floor, and a plurality of elastomeric tool box straps extending between the spaced pairs of loops of the support floor first side edge and second side edge extending over the tool box to permit selective securement of the tool box relative to the tool box tray.

2. An apparatus as set forth in claim 1 including a mesh basket pivotally mounted between the right support post and left support post adjacent the tool box tray, wherein the mesh basket extends orthogonally between the right support post and left support post and includes a mesh basket right support axle and a mesh basket left support axle, wherein the mesh basket right support axle and the mesh basket left support axle are coaxially aligned and wherein the mesh basket right support axle is fixedly mounted to the right support post and the mesh basket left support axle is fixedly mounted to the left support post.

3. An apparatus as set forth in claim 2 including a cooler tray plate pivotally mounted between the right support post and left support post, including a cooler tray left axle and a cooler tray right axle integrally mounted to the respective right support post and left support post respectively, wherein the cooler tray left axle and the cooler tray right axle are coaxially aligned, and a cooler housing is mounted to the cooler tray plate, and a plurality of cooler tray plate elastomeric bands are mounted to the cooler tray plate and extend over the cooler housing to permit selective securement of the cooler housing to the cooler tray plate.

4. An apparatus as set forth in claim 3 including a lantern support first leg integrally and orthogonally mounted to the left support post extending forwardly of the left support post, and a lantern support second leg integrally and orthogonally mounted to an upper distal end of the lantern support first leg, wherein the lantern support second leg includes a groove, and the lantern received within the groove when the rectilinear framework is in a second horizontal position from a first vertical position.

5. An apparatus as set forth in claim 4 including a support flange fixedly and integrally mounted to the right support post in a parallel relationship, wherein the support flange includes a plurality of fishing rod support tubes orthogonally directed through the support flange for securement of a fishing rod within each rod support tube of said fishing rod support tubes.

6. An apparatus as set forth in claim 5 including a bait canister selectively securable to the left support post, with the bait canister including a support tube, with the support tube including a plurality of spaced "U" shaped spring clips, wherein the "U" shaped spring clips are arranged for clamping reception of the left support tube therewithin for selective securement of the bait canister to the left support post, and the support tube including a lower cap mounted to a lower distal end of the support tube and an upper cap mounted to an upper distal end of the support tube, wherein the lower cap and the upper cap are selectively removable relative to the support tube for the positioning and removal of fishing bait within the support tube, and a refrigerant case mounted to the support tube, wherein the refrigerant case is in pneumatic communication with the support tube and is arranged for reception of a refrigerant therewithin to effect cooling of the support tube from the refrigerant case.

7. An apparatus as set forth in claim 6 wherein the refrigerant case includes a case base pivotally mounted to a case lid, the case base and the case lid including fastener means for securement of the base to the lid, and the base including a plurality of base compartments, and the lid including a plurality of lid compartments, wherein the base compartments and lid compartments are in a confronting relationship relative to one another arranged for reception of a refrigerant within the base compartments and lid compartments, and each base compartment and each lid compartment includes a cooperating base and lid compartment bore, and the support tube includes a bait tube bore aligned with each base and lid compartment bore to direct refrigerant from the refrigerant case to the support tube.

* * * * *